United States Patent
Nobori

(10) Patent No.: US 10,917,751 B2
(45) Date of Patent: Feb. 9, 2021

(54) TERMINAL DEVICE, PROGRAM, AND METHOD

(71) Applicant: GungHo Online Entertainment, Inc., Tokyo (JP)

(72) Inventor: Koichi Nobori, Tokyo (JP)

(73) Assignee: GungHo Online Entertainment, Inc.

( * ) Notice: Subject to any disclaimer, the term of this patent is extended or adjusted under 35 U.S.C. 154(b) by 0 days.

(21) Appl. No.: 16/717,446

(22) Filed: Dec. 17, 2019

(65) Prior Publication Data

US 2020/0404453 A1 Dec. 24, 2020

Related U.S. Application Data

(63) Continuation of application No. PCT/JP2019/024979, filed on Jun. 24, 2019.

(51) Int. Cl.
*H04W 4/029* (2018.01)
*H04W 4/02* (2018.01)
*A63F 13/216* (2014.01)
*A63F 13/23* (2014.01)
(Continued)

(52) U.S. Cl.
CPC ........... *H04W 4/029* (2018.02); *A63F 13/216* (2014.09); *A63F 13/23* (2014.09); *H04W 4/025* (2013.01); *A63F 13/211* (2014.09); *A63F 2300/105* (2013.01); *A63F 2300/1025* (2013.01); *G01S 19/49* (2013.01)

(58) Field of Classification Search
CPC ..... H04W 4/029; H04W 4/025; A63F 13/216; A63F 13/23; A63F 13/211; A63F 2300/1025; A63F 2300/105; G01S 19/49
See application file for complete search history.

(56) References Cited

U.S. PATENT DOCUMENTS

| 9,782,668 B1 | 10/2017 | Golden et al. | |
|---|---|---|---|
| 2005/0122236 A1* | 6/2005 | Brauer | G08G 1/123 340/995.24 |

(Continued)

FOREIGN PATENT DOCUMENTS

| JP | 2012-005652 A | 1/2012 |
|---|---|---|
| JP | 2014-087434 A | 5/2014 |

(Continued)

*Primary Examiner* — Dinh Nguyen
(74) *Attorney, Agent, or Firm* — Harness, Dickey & Pierce, P.L.C.

(57) ABSTRACT

A terminal device includes: a sensor configured to detect first and second current position information of a moving player at first and second times; a memory configured to store first and second area information identified in in response to a correspondence relationship between the detected current position information and one or a plurality of areas, and an instruction command; and a processor configured to execute firstly identify the first area information in response to the correspondence relationship, secondly identify the second area information in response to the correspondence relationship, and transmit at least one of the second current position information and the second area information to a server device via a communication interface when the first area information is different from the second area information.

15 Claims, 8 Drawing Sheets

(51) Int. Cl.
    *A63F 13/211*     (2014.01)
    *G01S 19/49*     (2010.01)

(56) References Cited

U.S. PATENT DOCUMENTS

| | | | | |
|---|---|---|---|---|
| 2005/0243784 | A1* | 11/2005 | Fitzgerald | G06Q 30/02 370/338 |
| 2005/0272445 | A1* | 12/2005 | Zellner | H04M 1/72572 455/456.2 |
| 2006/0229058 | A1* | 10/2006 | Rosenberg | H04W 4/029 455/404.2 |
| 2011/0250875 | A1* | 10/2011 | Huang | H04W 4/026 455/418 |
| 2012/0258734 | A1* | 10/2012 | Takahashi | H04W 4/029 455/456.1 |
| 2015/0169597 | A1* | 6/2015 | Edge | G06F 16/9537 707/751 |
| 2019/0316917 | A1* | 10/2019 | Zhang | H04W 4/026 |

FOREIGN PATENT DOCUMENTS

| | | |
|---|---|---|
| JP | 2014-182630 A | 9/2014 |
| JP | 2018-057459 A | 4/2018 |
| WO | WO-2018-158836 A1 | 9/2018 |
| WO | WO-2019-012683 A1 | 1/2019 |

* cited by examiner

FIG. 5A

| PLAYER ID | PLAYER NAME | CURRENT POSITION | AREA ID | CUMULATIVE MOVING DISTANCE | STOPPED TIME |
|---|---|---|---|---|---|
| U1 | A | (N1,E1) | A1 | 4.5km | S1 |
| ... | ... | ... | ... | ... | ... |

FIG. 5B

| PLAYER ID | PLAYER NAME | MOVING DISTANCE | PLAYER CHARACTER | TRANSFER DESTINATION | POSITION | AREA |
|---|---|---|---|---|---|---|
| U1 | A | 5km | C1 | C4 | (N1,E1) | A1 |
| U2 | B | 100km | C2 | - | (N2,E2) | A2 |
| U3 | C | 250km | C3 | - | (N3,E3) | A3 |
| U4 | D | 8km | C4 | - | (N4,E4) | A1 |
| U5 | E | 95km | C5 | N1 | (N5,E5) | A5 |
| ... | ... | ... | ... | ... | ... | ... |

FIG. 5C

| CHARACTER ID | OFFENSIVE POWER | HIT POINT | NUMBER OF TIMES | TIME | TOTAL TIME | DISTANCE |
|---|---|---|---|---|---|---|
| C1 | 50 | 300 | 3 | T1 | P1 | 50km |
| C2 | 100 | 250 | - | - | - | - |
| C3 | 20 | 520 | - | - | - | - |
| C4 | 250 | 250 | - | - | - | - |
| C5 | 120 | 400 | - | - | - | 10km |
| ... | ... | ... | ... | ... | ... | ... |

TERMINAL DEVICE, PROGRAM, AND METHOD

CROSS-REFERENCE TO RELATED APPLICATIONS

The present application is a continuation application of International Application No. PCT/JP2019/024979, filed on Jun. 24, 2019, which is expressly incorporated herein by reference in its entirety.

BACKGROUND

1. Technical Field

The present disclosure relates to a terminal device, a program, and a method, each configured to execute a game application that progresses by using a player's current position information.

2. Related Art

Conventionally, there is known a terminal device that is configured to execute a game using a player's current position information. For example, with a terminal device disclosed in JP 2012-005652 A, during execution of a game, a GPS obtains position information of the terminal device in a real world environment. Then, the position information obtained is transmitted to a server device, in accordance with which the game progresses.

SUMMARY

In view of the foregoing, various embodiments of the present disclosure provides a terminal device, a program, and a method, each being capable of executing an application more effectively by using a player's current position information.

According to one aspect of the present disclosure, there is provided a "terminal device including: a sensor configured to detect current position information of a player that moves; a memory configured to store the current position information detected by the sensor, area information identified in correspondence to the current position information detected by the sensor based on a correspondence relationship between one or a plurality of area and current position information, and an instruction command predetermined; a communication interface configured to transmit predetermined information to a server device remotely disposed; and a processor configured to: newly identify area information in correspondence to current position information newly detected based on the correspondence relationship; and execute the instruction command stored in the memory in order to transmit at least one of the current position information and the area information newly identified to the server device via the communication interface, when the area information newly identified is different from the area information stored in the memory".

According to one aspect of the present disclosure, there is provided a "program for causing a computer to execute a processing operation by a processor, the computer including: a sensor configured to detect current position information of a player that moves; a memory configured to store area information identified in correspondence to the current position information detected by the sensor based on a correspondence relationship between one or a plurality of area and current position information; and a communication interface configured to transmit predetermined information to a server device remotely disposed, the computer configured to: newly identify area information in correspondence to current position information newly detected based on the correspondence relationship; and transmit at least one of the current position information and the area information newly identified to the server device via the communication interface when the area information newly identified is different from the area information stored in the memory".

According to one aspect of the present disclosure, there is provided a "method for causing a processor in a computer to execute an instruction command predetermined, the computer including: a sensor configured to detect current position information of a player that moves; a memory configured to store area information identified in correspondence to the current position information detected by the sensor based on a correspondence relationship between one or a plurality of area and current position information, and the instruction command predetermined; and a communication interface configured to transmit predetermined information to a server device remotely disposed, the method including the steps of: newly identifying area information in correspondence to current position information newly detected based on the correspondence relationship; and transmitting at least one of the current position information and the area information newly identified to the server device via the communication interface when the area information newly identified is different from the area information stored in the memory".

According to various embodiments of the present disclosure, there is provided a terminal device, a program, and a method, each configured to use a player's position information so as to execute a new application in which the player collaborates with the other players.

It should be noted that the effect described above is to be considered as merely illustrative for convenience of description and is not restrictive. In addition to or in place of the effect described above, any other effect described in the present disclosure or an apparent effect for those skilled in the art may be exhibited.

BRIEF DESCRIPTION OF THE DRAWINGS

FIG. 5A is a diagram conceptually illustrating player information stored in the terminal device according to the first embodiment of the present disclosure. FIG. 5B is a diagram conceptually illustrating a player information table stored in the server device according to the first embodiment of the present disclosure. FIG. 5C is a diagram conceptually illustrating a character information table stored in the server device according to the first embodiment of the present disclosure.

DESCRIPTION OF EXEMPLARY EMBODIMENTS

Figure 1A:
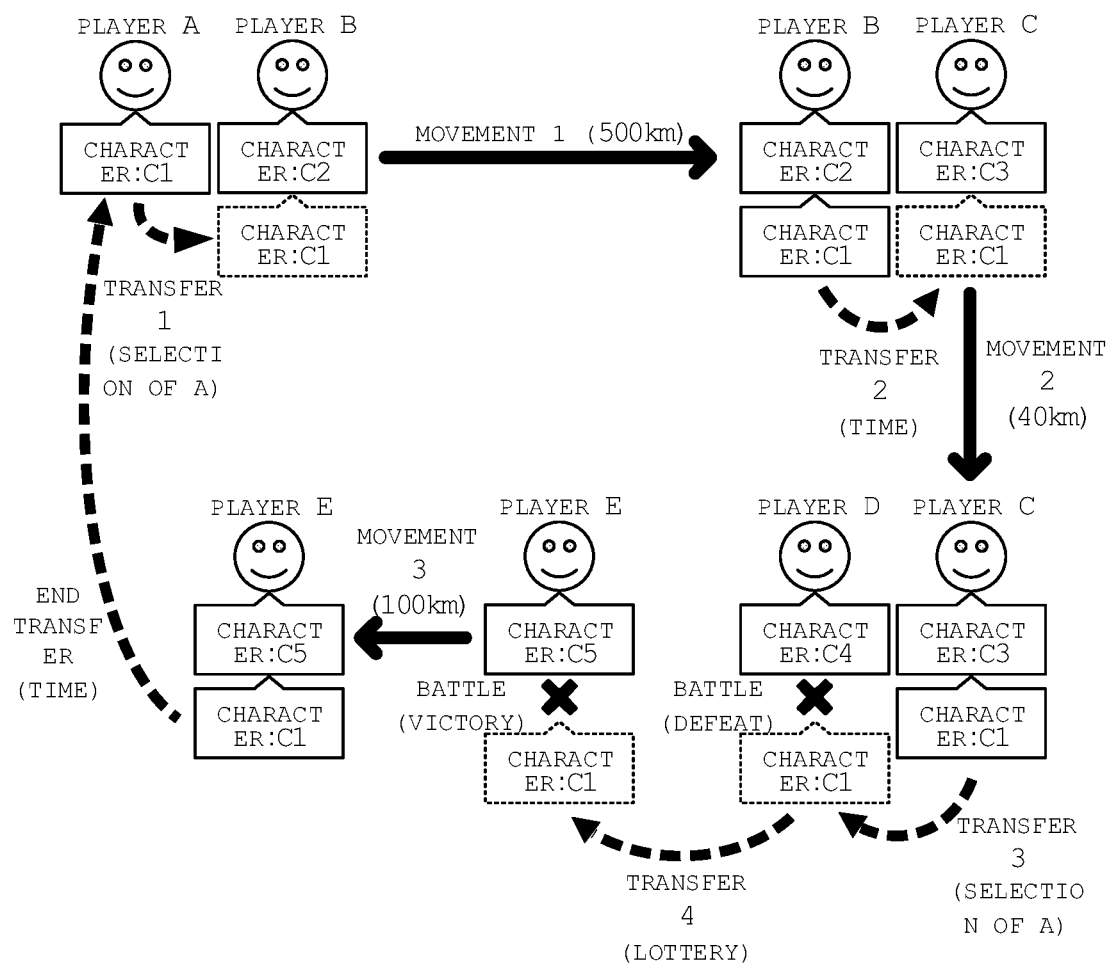
FIG. 1A is a diagram conceptually illustrating execution of an application according to various embodiments of the present disclosure.

Various embodiments of the present disclosure will be described with reference to the appended drawings. It should be noted that shared constituent elements in the drawings are denoted with the same reference signs.

Outline of Application According to Present Disclosure

An example of an application according to various embodiments of the present disclosure includes an application in which a player transfers an item that the player virtually possesses to the other players positioned in a vicinity of the player. Then, the player varies a parameter value of the item in accordance with a distance that each of the other players, to which the item has been transferred, moves in a real world environment.

A typical example of such an application includes a game application, such as a competing game in which a plurality of characters battle against one another, a breakout game, a puzzle game, a role playing game, and a sport game. An outline of the application according to this embodiment will be described below with reference to the competing game as an example.

FIG. 1A is a diagram conceptually illustrating progress of the application according to various embodiments of the present disclosure. According to FIG. 1A, based on a player A's current position information, the player A selects a player B among the other players positioned within a predetermined range of the player A. Then, the player A virtually transfers a player character C1 that the player A operates to the player B (Transfer 1). Next, the player B virtually leads each of a player character C2 that the player B possesses and the player character C1 that has been transferred to the player B, and moves to an arbitrary position in the real world environment (Move 1). Then, at the moving destination, the player character C1 is transferred from the player B to a player C based on a predetermined event (Transfer 2). Next, the player C virtually leads each of a player character C3 that the player C possesses and the player character C1 that has been transferred to the player C, and moves to an arbitrary position in the real world environment (Move 2). Then, at the moving destination, the player character C1 is again transferred from the player C to a player D based on a predetermined event (Transfer 3). In this case, the player D selects to cause a virtual battle between the player character C1 that has been transferred to the player D and a player character C4 that the player D possesses. In a case that the player character C1 is defeated in the battle, the player character C1 is not allowed to remain transferred to the player D, thereby being transferred to a player E (Transfer 4). Then, the player E selects to cause a virtual battle between the player character C1 that has been transferred to the player E and a player character C5 that the player E possesses. In a case that the player character C1 wins the battle, the player character C1 remains transferred to the player E. Then, the player E virtually leads each of the player character C5 that the player E possesses and the player character C1 that has been transferred to the player E, and moves to an arbitrary position in the real world environment (Move 3). In a length of predetermined second time after the first transfer (Transfer 1), the player character C1 completes the transfers and returns to the player A where the player character C1 originates.

In the application above, the player character C1 that the player A possesses is allowed to be repeatedly transferred to various players based on various events. At each of transfer destinations, current position information of the corresponding player, to which the player character C1 has been transferred, is obtained as needed. This configuration causes a distance that the player character C1 has moved with the various players (for example, a cumulative total of Move 1, Move 2, and Move 3) to be calculated. Based on the distance calculated, it is possible to vary an ability score of the player character C1.

Further, in the application above, a virtual world space is divided into one or a plurality of areas in correspondence to, for example, municipalities or prefectures in a real world space. Accordingly, the player character C1 that the player A possesses is allowed not only to be transferred to the various players but also to move with each of the various players, so as to visit various areas. Then, the player character C1 provides benefit for the player A in accordance with each of the various areas that the player character C1 visits.

In other words, with the application above, from the player A's point of view, the player A operates the player character C1 that the player A possesses to, so to speak, "travel" with the other players. In accordance with the distance or the area that the player character C1 has "traveled", the player A strengthens the player character C1 or gains the benefit.

Figure 1B:
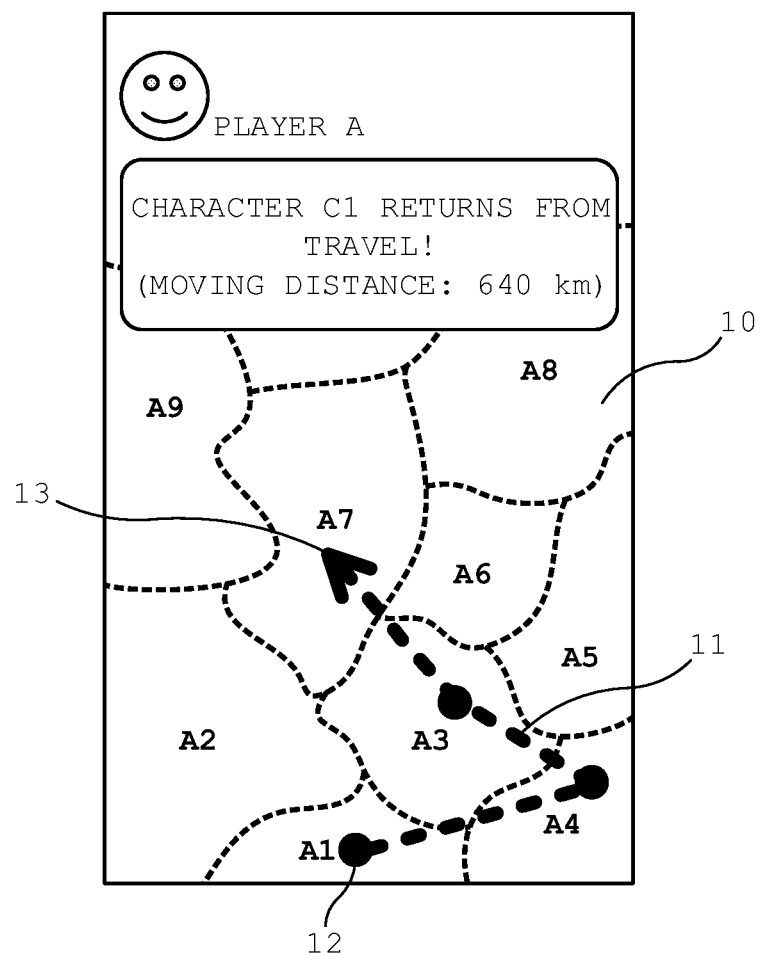
FIG. 1B is a diagram illustrating an example of a screen displayed on a terminal device according to the various embodiments of the present disclosure.

FIG. 1B is a diagram illustrating an example of a screen displayed on a terminal device according to the various embodiments of the present disclosure. Specifically, FIG. 1B is an example of a screen displayed when the player character C1 that the player A possesses "completes the transfers" (as illustrated in FIG. 1A) and returns to the player A. According to FIG. 1B, a virtual world space 10 displayed on the terminal device includes one or the plurality of areas (areas A1 to A9).

The player character C1 moves with each of the players in the real world space, and concurrently moves in the virtual world space 10 in correspondence to the real world space. The player character C1's moving locus in the virtual world space 10 is illustrated by an arrow 11. In other words, the player character C1 has moved in the virtual world space 10 in a sequential order of the areas A1, A4, A3, and A7 from a starting point 12 to a final destination point 13, and has concurrently moved a distance of 640 km in the real world space in correspondence to the virtual world space 10. Each of the distance and the areas that the player character C1 has traveled is calculated based on the position information of the corresponding player (among the player B, the player C, and the player E in FIG. 1A) to which the player character C1 has been transferred. The position information is transmitted as needed from each of terminal devices that the corresponding player holds, in accordance with the corresponding player's moves.

In the application above, the "transfer", the "virtual transfer" or the like is performed. With this configuration, on a player information table, character identification information of a character that each of the players possesses is stored along with player identification information of the corresponding player. When the character is transferred to one of the other players, the character identification information of the character is subjected to processing operations, such as being copied or updated, to be stored in correspondence with the player to which the character is transferred. When the character is transferred again from "the player to which the character has been transferred" to "another player to which the character is to be newly transferred", the character identification information in correspondence to the current player identification information (of "the player to which the character has been transferred") may be completely deleted, or may remain.

In the present disclosure, typically, the virtual world space in the application is formed in correspondence to the real world space. Accordingly, each of current position information and position information detected and obtained in the real world space is in correspondence to a specific position in the virtual world space. Similarly, one or each of the plurality of areas configuring the virtual world space is formed in correspondence to a predetermined position in the real world space.

First Embodiment

Figure 2:
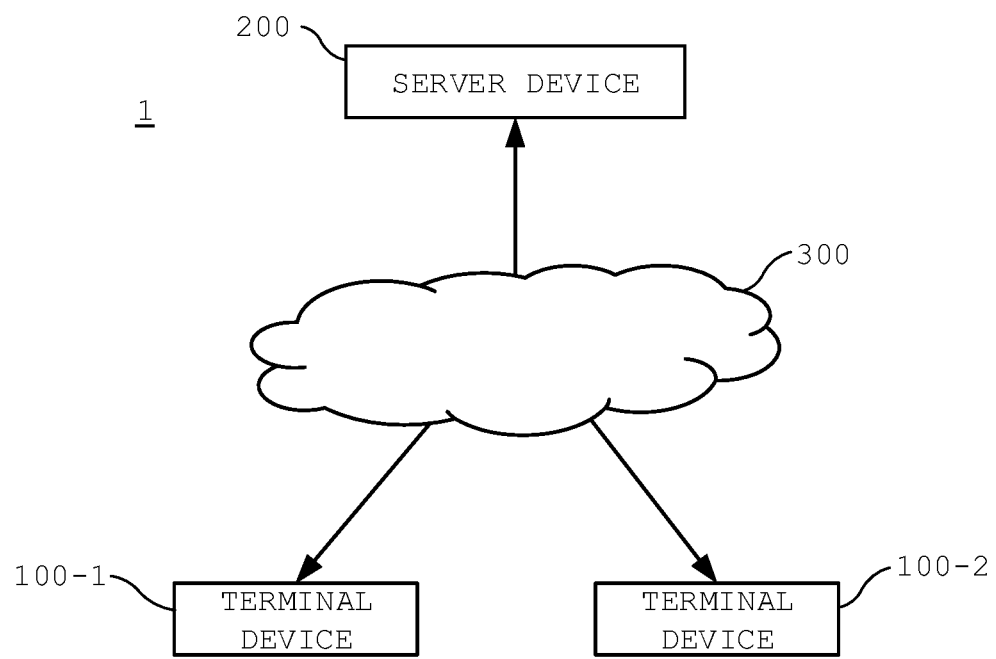
FIG. 2 is a conceptual diagram schematically illustrating a configuration of a system according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes a plurality of terminal devices 100 that include at least a terminal device 100-1 and a terminal device 100-2, and a server device 200 that is communicatively connected to the terminal devices 100 via a network 300. In the system 1, each of the server device 200 and the terminal devices 100 executes a program stored in a memory, so as to execute a processing operation for an application according to this embodiment. The server device 200 and the terminal devices 100 communicate with each other as needed, and transmit and receive various types of information (e.g., FIGS. 5A to 5C), programs, and the like, each of which is required for progress of the application.

In an example of FIG. 2, only two of the terminal devices 100 are illustrated, but three or more of the terminal devices 100 may naturally be included here. The server device 200 is illustrated as a single server device, but each constituent element and processing operation for the server device 200 may be allocated to a plurality of server devices.

2. Configuration of Terminal Devices 100

Figure 3:
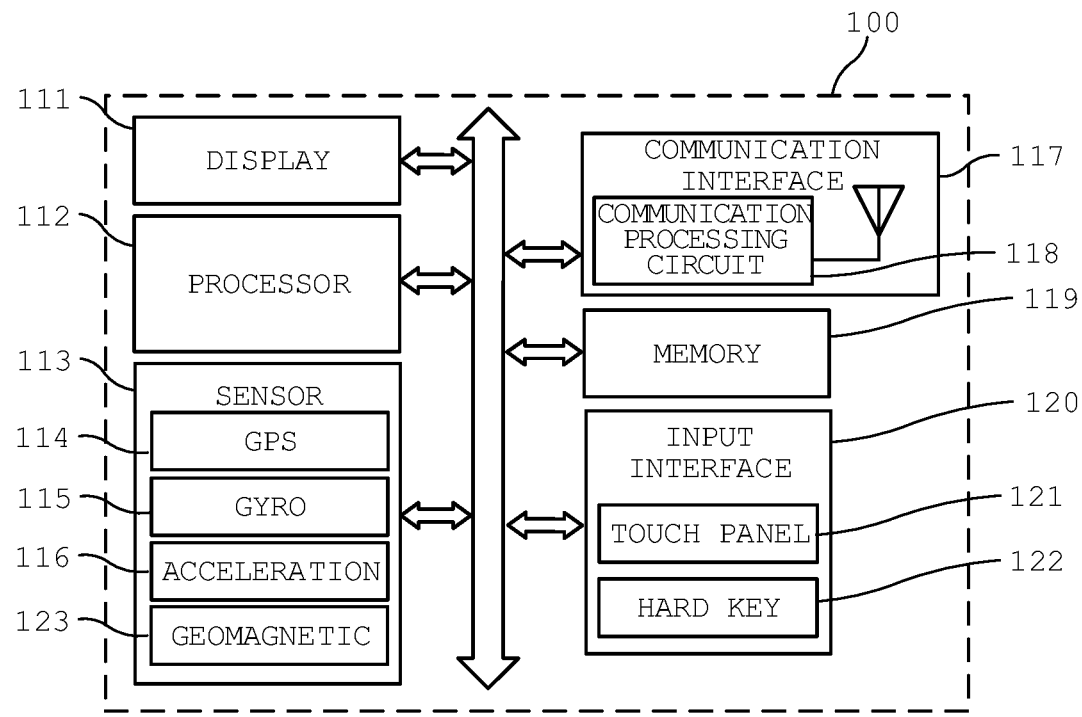
FIG. 3 is a block diagram illustrating an example of a configuration of a terminal device according to the first embodiment of the present disclosure.

FIG. 3 is a block diagram illustrating an example of a configuration of each of the terminal devices 100 according to the first embodiment of the present disclosure. Each of the terminal devices 100 is not required to include all constituent elements illustrated in FIG. 3, and may have a configuration that excludes some of the constituent elements, or a configuration that includes other additional constituent elements.

Each of the terminal devices 100 is, as an example, a terminal device that is portable and wirelessly communicable, as represented by a smart phone. In addition to the terminal device above, the present invention may preferably be applied to a portable device, such as a portable game machine, a feature phone, a portable information terminal, a PDA, or a laptop personal computer. Further, in the system 1, the plurality of terminal devices 100 are included, but the terminal devices 100 are not necessarily identical or similar to each other. For example, the terminal device 100-1 may be a smart phone, and the terminal device 100-2 may be a portable game machine.

According to FIG. 3, each of the terminal devices 100 includes a display 111, a processor 112, a sensor 113, a communication interface 117, a memory 119, and an input interface 120. The sensor 113 includes a GPS sensor 114, a gyro sensor 115, an acceleration sensor 116, and a geomagnetic sensor 123. The communication interface 117 includes a communication processing circuit 118 and an antenna. The memory 119 includes at least a RAM, a ROM, a nonvolatile memory (in some cases, an HDD), or the like. The input interface 120 includes a touch panel 121 and a hard key 122. These constituent elements are electrically connected with one another via a control line and a data line.

Figure 8:
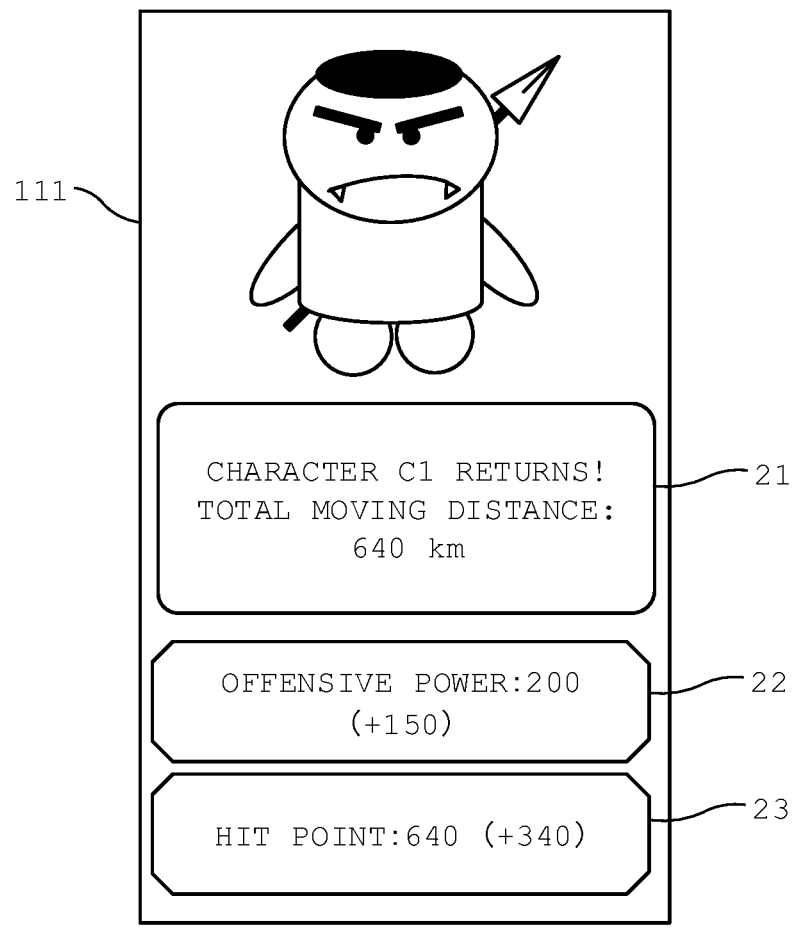
FIG. 8 is a diagram illustrating an example of a screen displayed on a display in the terminal device according to the first embodiment of the present disclosure.

The display 111 functions as a display unit that, in response to an instruction by the processor 112, reads out image information stored in the memory 119 and performs various types of display including the virtual world space formed by the application according to this embodiment (e.g., FIGS. 1B and 8). The display 111 is, for example, a liquid crystal display or an organic EL display.

The input interface 120 includes the touch panel 121, the hard key 122, and/or the like, and receives various instructions or inputs by a player. The touch panel 121 is disposed to cover the display 111, and outputs information of position coordinates, which corresponds to image data displayed on the display 111, to the processor 112. As a touch panel system, a known system may be used, such as a resistive film system, an electrostatic capacitive coupling system, or an ultrasonic surface acoustic wave system. In this embodiment, the touch panel 121 detects a swipe operation or a tap operation on each item displayed on the display 111 in response to the instruction.

The processor 112 is a CPU (microcomputer), and functions as a control unit that controls other constituent elements connected, based on various programs stored in the memory 119. Specifically, the processor 112 reads out from the memory 119 a program for executing the application according to this embodiment or a program for executing an OS and executes the program. In this embodiment, in particular, the processor 112 executes the following processing operations: a processing operation for identifying area identification information that indicates an area in the virtual world space in correspondence to current position information detected by the sensor 113; and a processing operation for storing the area identification information identified in the memory 119. When current position information is newly obtained, the processor 112 executes the following processing operations: a processing operation for newly identifying area identification information in correspondence to the current position information newly detected, based on a correspondence relationship between current position information and area information; a processing operation for comparing the area identification information stored in the memory 119 and the area identification information newly identified; and a processing operation for transmitting at least one of the area identification information newly identified and the current position information to the server device 200 via the communication interface 117, when the area identification information stored and the area identification information newly identified differ from each other. Additionally, the processor 112 executes the following processing operations: a processing operation for storing in the memory 119 a distance (cumulative total value) that the player has moved from a point at which the area identification information and/or the current position information was previously transmitted to the server device 200; a processing operation for transmitting at least one of the area identification information newly identified and the current position information to the server device 200 via the communication interface 117 when the distance (cumulative total value) stored in the memory 119 is longer than a second distance previously determined; and a processing operation for resetting the distance (cumulative total value) stored in the memory 119 when transmitting at least one of the area identification information newly identified and the current position information to the server device 200. Further, when an instruction input by the player is received or elapsed time from a moment that the instruction input by the player is received exceeds a predetermined length of time, the processor 112 switches from a second mode in which the sensor 113 detects the current position information at high frequency (e.g., a mode in which the application is activated in a foreground) to a first mode in which the sensor 113 detects the current position information at lower frequency (e.g., a mode in which the application is activated in a background). The processor 112 executes each processing operation in accordance with the corresponding mode. The processor 112 may be a single CPU, and alternatively may be configured from a plurality of CPUs. Still alternatively, the processor 112 may be configured from an appropriate combination of other types of processors such as a GPU dedicated to image processing.

The memory 119 includes the ROM, the RAM, the nonvolatile memory, the HDD, or the like, and functions as a storage unit. The ROM stores an instruction command for executing the OS or the application according to this embodiment as a program. The RAM is a memory used to write and read data while the program stored in the ROM is being processed by the processor 112. The nonvolatile memory is a memory that writes and reads the data at execution of the program. The data written here is stored after the execution of the program terminates. In this embodiment, in particular, the memory 119 stores programs, based on which the processor 112 executes the following processing operations: the processing operation for identifying the area identification information that indicates the area in the virtual world space in correspondence to the current position information detected by the sensor 113; and the processing operation for storing the area identification information identified in the memory 119. The memory 119 also stores programs, based on which the processor 112 executes the following processing operations when the current position information is newly obtained: the processing operation for newly identifying area identification information in correspondence to the current position information newly detected, based on the correspondence relationship between current position information and area information; the processing operation for comparing the area identification information stored in the memory 119 and the area identification information newly identified; and the processing operation for transmitting at least one of the area identification information newly identified and the current position information to the server device 200 via the communication interface 117, when the area identification information stored and the area identification information newly identified differ from each other. Additionally, the memory 119 stores programs, based on which the processor 112 executes the following processing operations: the processing operation for storing in the memory 119 the distance (cumulative total value) that the player has moved from the point at which the area identification information and/or the current position information was previously transmitted to the server device 200; the processing operation for transmitting at least one of the area identification information newly identified and the current position information to the server device 200 via the communication interface 117 when the distance (cumulative total value) stored in the memory 119 is longer than the second distance previously determined; and the processing operation for resetting the distance (cumulative total value) stored in the memory 119 when transmitting at least one of the area identification information newly identified and the current position information to the server device 200. Further, the memory 119 stores a program, based on which the processor 112 executes each processing operation in accordance with the corresponding mode as follows: when the instruction input by the player is received or the elapsed time from the moment that the instruction input by the player is received exceeds the predetermined length of time, the processor 112 switches from the second mode in which the sensor 113 detects the current position information at high frequency (e.g., the mode in which the application is activated in the foreground) to the first mode in which the sensor 113 detects the current position information at lower frequency (e.g., the mode in which the application is activated in the background).

The memory 119 stores a player information table (FIG. 5A) that is updated as needed in response to each of the processing operations by the processor 112. The memory 119 also stores, while not particularly illustrated, area map information in the virtual world space. With the area map information in which the area identification information for identifying the area in the virtual world space and the current position information in the real world space correspond to each other, the processor 112 determines whether or not each of the terminal devices 100 is positioned at any one of the corresponding areas in the virtual world space based on the current position information detected by the sensor 113.

The communication interface 117 functions as a communication unit that transmits and receives information to and from the server device 200 remotely disposed or other terminal devices via the communication processing circuit 118 and the antenna. The communication processing circuit 118 performs a processing operation for receiving the program for executing the application according to this embodiment, the various types of information used in the application, or the like from the server device 200, in accordance with the progress of the application. The communication processing circuit 118 also performs a processing operation for transmitting a result of executing the application to the server device 200. In this embodiment, in particular, the communication processing circuit 118 transmits the position information stored in the memory 119 to the server device 200 as well as receives character information from the server device 200.

The communication processing circuit 118 performs a processing operation based on a broadband wireless communication system represented by a wideband-code division multiple access (W-CDMA) system. Alternatively, the communication processing circuit 118 may perform a processing operation based on a system related to a wireless LAN represented by IEEE802.11 or related to narrowband wireless communication such as Bluetooth (registered trademark). Still alternatively, the communication processing circuit 118 may perform a processing operation based on wired communication in place of, or in addition to, wireless communication.

The sensor 113 includes the GPS sensor 114, the gyro sensor 115, the acceleration sensor 116 and the geomagnetic sensor 123. The GPS sensor 114 detects the current position information of each of the terminal devices 100 by communicating with a plurality of satellites. The GPS sensor 114 may detect the current position information at predetermined intervals (e.g., every three minutes) and preferably, may vary the intervals based on whether the application is activated in the background or activated in the foreground, such as every 10 minutes in the first mode and every three minutes in the second mode. In this embodiment, the current position information detected by the sensor 113 may be coordinates information in the real world space such as latitude and longitude, or may be information identifying an area formed in the real world space (e.g., municipalities or prefectures). Additionally, in this embodiment, the GPS sensor 114 or others is described as an example of the sensor 113, but this embodiment is not limited thereto. The current position information may be information for a Wi-Fi access point or a base station for broadband wireless communication, and a communication processing unit capable of obtaining the information above may be used as the sensor 113.

3. Configuration of Server Device 200

Figure 4:
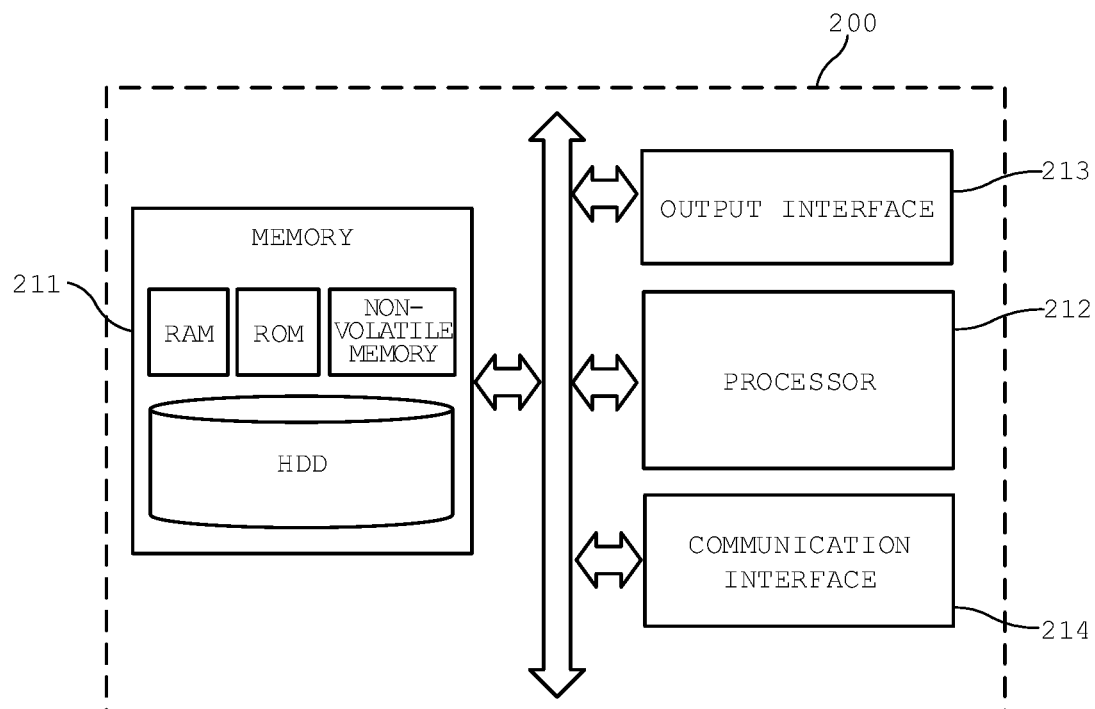
FIG. 4 is a block diagram illustrating an example of a configuration of a server device according to the first embodiment of the present disclosure.

FIG. 4 is a block diagram illustrating an example of a configuration of the server device 200 according to the first embodiment of the present disclosure. The server device 200 is not required to include all constituent elements illustrated in FIG. 4, and may have a configuration that excludes some of the constituent elements, or a configuration that includes other additional constituent elements.

According to FIG. 4, the server device 200 includes a memory 211, a processor 212, an output interface 213, and a communication interface 214. The memory 211 includes a RAM, a ROM, a nonvolatile memory, an HDD, or the like. The processor 212 is a CPU or the like. These constituent elements are electrically connected with one another via a control line and a data line.

The memory 211 includes the RAM, the ROM, the nonvolatile memory, the HDD, or the like, and functions as a storage unit. The memory 211 stores an instruction command for executing the OS or the application according to this embodiment as the program. Such a program is loaded and executed by the processor 212. The memory 211 also stores the player information table described in FIG. 5B and a character information table described in FIG. 5C. Further, while the program above is being executed by the processor 212, the memory 211 (particularly, the RAM) is temporarily used to write and read data. In this embodiment, in particular, the memory 211 stores programs, based on which the processor 212 executes the following processing operations: a processing operation for receiving position information from each of the terminal devices 100; a processing operation for updating the player information table and the character information table based on the position information received; a processing operation for reading out information for the number of transfers and distance with respect to each character, the information being stored in the memory 211, in a case that total time from when the corresponding character is transferred exceeds a length of second time previously determined (e.g., 24 hours); and a processing operation for varying an ability score of the corresponding character in accordance with the information read out, updating the character information table, and transmitting the character information updated to each of the terminal devices 100.

The processor 212 is a CPU (microcomputer), and functions as a control unit that controls other constituent elements connected, based on various programs stored in the memory 211. In this embodiment, in particular, the processor 212 executes the following processing operations: the processing operation for receiving the position information from each of the terminal devices 100; the processing operation for updating the player information table and the character information table based on the position information received; the processing operation for reading out the information for the number of transfers and the distance with respect to each character, the information being stored in the memory 211, in the case that the total time from when the corresponding character is transferred exceeds the length of second time previously determined (e.g., 24 hours); and the processing operation for varying the ability score of the corresponding character in accordance with the information read out, updating the character information table, and transmitting the character information updated to each of the terminal devices 100. The processor 212 may be a single CPU, and alternatively may be configured from a plurality of CPUs.

The communication interface 214 performs a processing operation such as modulation or demodulation so as to transmit and receive the programs for executing the game application according to this embodiment and the various types of information to and from, as an example, each of the terminal devices 100 via the network 300 or another server device via the network 300. The communication interface 214 communicates with each of the terminal devices or another server device in accordance with the wireless communication system above or a known wired communication system. In this embodiment, in particular, the communication interface 214 receives the position information from each of the terminal devices 100 as well as transmits the character information to each of the terminal devices 100.

The output interface 213 functions, while not particularly illustrated, as an information input/output unit for inputting and outputting information to and from various external devices such as a printer or a display. The output interface 213 may employ a known connection system such as a serial port, a parallel port, or a USB at demand.

4. Information Stored in the Memory 211 of the Server Device 200

FIG. 5A is a diagram conceptually illustrating player information stored in each of the terminal devices 100 according to the first embodiment of the present disclosure. The player information is stored, as an example, in the memory 119 in each of the terminal devices 100.

Figure 6:
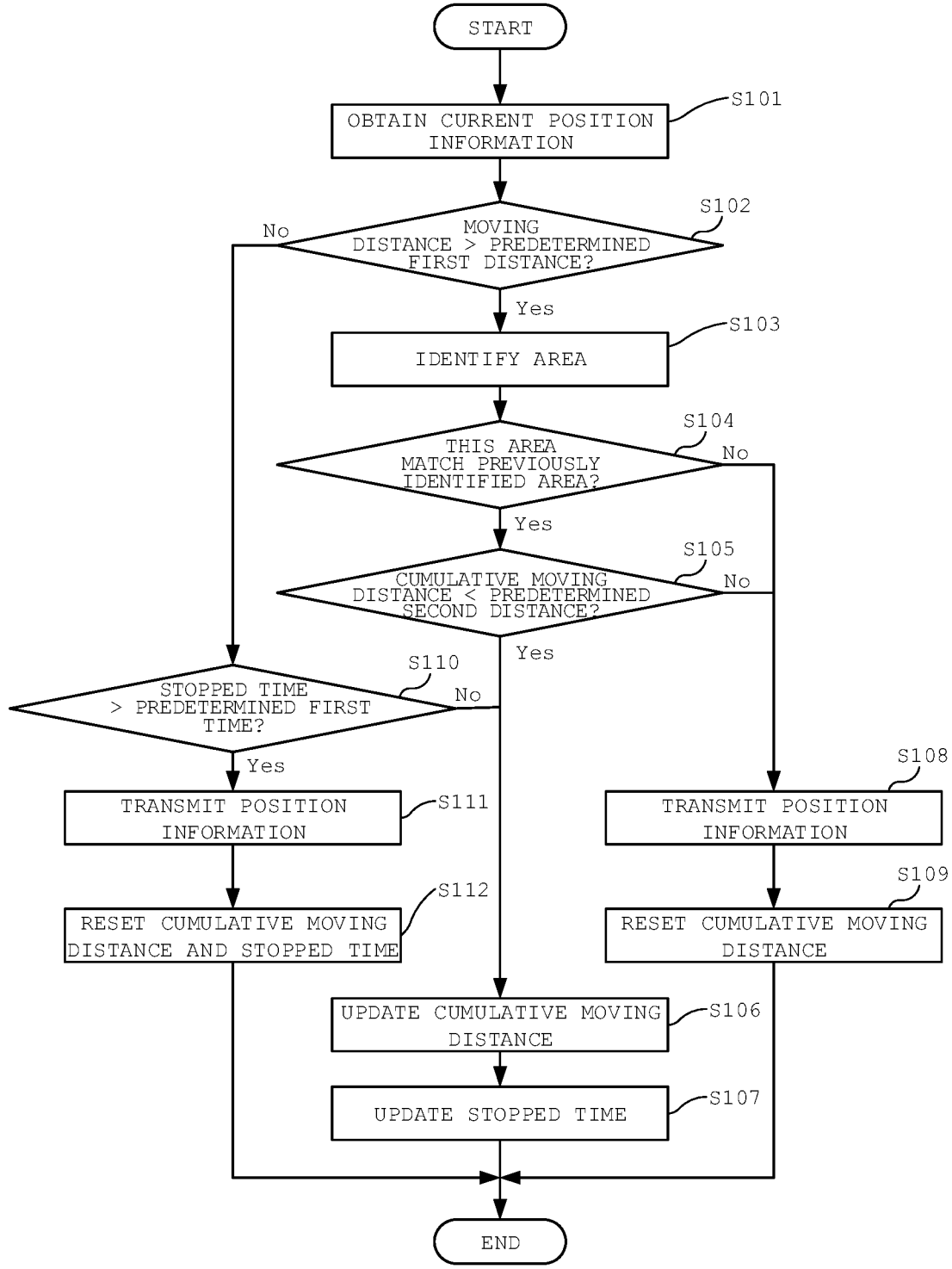
FIG. 6 is a diagram illustrating a flow of processing operations executed in the terminal device according to the first embodiment of the present disclosure.

According to FIG. 5A, for each player identification (player ID) information, the corresponding information is stored, such as player name information, current position information, area identification (area ID) information, cumulative moving distance information, and stopped time information. The "player identification (player ID) information" is information characteristic of each player, that is, information for identifying the corresponding player. The "player name information" indicates a name that each player uses in the application. The "current position information" is coordinate information (e.g., latitude and longitude) detected by the sensor 113, and is stored whenever the processing operation for transmitting the player's position information (as illustrated in FIG. 6) is performed. The "area identification (area ID) information" is information for identifying an area in the virtual world space in correspondence to the player's current position information. Each of the areas in the virtual world space corresponds to an area in the real world space (e.g., municipalities or prefectures). Accordingly, as the area identification information, the information for identifying the area in the virtual world space may be replaced by information for identifying the area set in the real world space. The "cumulative moving distance information" is information indicating a cumulative total value of distance that the player has traveled since the last transmission of the player's position information to the server device 200. The "cumulative moving distance information" is used to determine whether or not to transmit the player's position information to the server device 200. The "stopped time information" is information indicating a length of time during which each of the terminal devices 100 is not moved but remains stopped. The "cumulative moving distance information" is used to determine whether or not to transmit the player's position information to the server device 200.

FIG. 5B is a diagram conceptually illustrating the player information table stored in the server device 200 according to the first embodiment of the present disclosure. The player information table is stored, as an example, in the HDD of the memory 211 in the server device 200.

According to FIG. 5B, for each player identification (player ID) information, the corresponding information is stored, such as player name information, moving distance information, player character information, transfer destination information, position information, and area information. The "player identification (player ID) information" is information characteristic of each player, that is, information for identifying the corresponding player. The "player name information" indicates a name that each player uses in the application. The "moving distance information" is information indicating a distance that each player moves within a predetermined period of time, the distance being calculated based on the position information received from the terminal devices 100 that the corresponding player carries. In this embodiment, the player is provided with benefit in accordance with moving distance made by the other players, to which a player character that the player possesses is transferred, and the moving distance information is used for this processing operation. The "player character information" is information for identifying a player character that the player possesses as one of "items" in this embodiment, that is, information for identifying one or a plurality of virtual characters that the player is capable of operating. Here, as the "player character information", player character identification (player character ID) information provided to each player character as a characteristic is stored. The "transfer destination information" indicates to which player, each player character described with the corresponding player identification information, is currently transferred. Specifically, in FIG. 1A, when the player character C1 that the player A possesses is transferred to the player D, the player character C4 that the player D possesses (as described in the player character identification information) is stored in correspondence to the player character C1. On the other hand, as exemplified by the player character C5 described in the player identification information "U5", the player character C1 is transferred to a player that possesses a non-player character. In this case, non-player character identification information N1 is stored in correspondence to the player character C5. The "transfer destination information" is updated whenever each player character is transferred. The "position information" is information indicating each player's current position. The "position information" is updated whenever the server device 200 receives the current position information detected by each of the terminal devices 100. Further, the "position information" is used, for example, to calculate each character's "distance information". As the "area information", area identification (area ID) information received from each of the terminal devices 100 is stored. The "area information" is updated whenever the server device 200 receives the position information. The "area information" is used, for example, to provide each player with benefit.

FIG. 5C is a diagram conceptually illustrating the character information table stored in the server device 200 according to the first embodiment of the present disclosure. The character information table is stored, as an example, in the HDD of the memory 211 in the server device 200.

According to FIG. 5C, for each character identification (character ID) information, the corresponding information is stored, such as ability scoring parameter information (e.g., offensive power information and hit point information), the number of times information, time information, total time information, and distance information. The "character identification (character ID) information" is information characteristic of each character, that is, information for identifying the corresponding character. The "offensive power information" is one of the ability scoring parameter, and is a parameter used to calculate damage that each character causes to the other characters as the character's opponents in a battle. The "hit point information" is a parameter that is decreased from a predetermined value in accordance with the damage caused to each character. When the character has zero hit point here, the character's unit game is processed as "defeat", use of the character is restricted, or the like. The "number of times information" indicates the number of times that each character has been transferred to the other players. When the character completes being transferred, the number of times returns to zero. The "time information" indicates a period of time from when each character became in correspondence to a player that is currently stored as the character's transfer destination information in FIG. 5B. In other words, the time information is reset to zero whenever the character further corresponds to any other player (any other player identification information) as the character's transfer destination information. Then, the count starts from zero. The "total time information" indicates a period of time from when each character first corresponded to any other player (any other player identification information). In other words, when the character completes being transferred, the total time information is reset to zero. Then, when the character begins being transferred again, the count starts from zero. The "distance information" is calculated based on the current position information provided by each of the other players to which the character has been transferred, specifically based on the current position information measured by the terminal devices 100 that the corresponding player holds. While the character remains transferred to the corresponding player, the player's moving distance is accumulated. In the distance information, the distance continues to be accumulated from the character's first transfer until completion of the character's transfer. In other words, when the character completes the transfers after having been sequentially transferred to the plurality of players, the cumulative total of the players' moving distances is stored as the distance information.

5. Flow of Processing Operations Performed by the Terminal Devices 100

FIG. 6 is a diagram illustrating a flow of processing operations executed in each of the terminal devices 100 according to the first embodiment of the present disclosure. Specifically, FIG. 6 illustrates a flow of the processing operations that the processor 112 executes by reading out the programs stored in the memory 119 at transmission of position information to the server device 200. The position information is used for the following processing operations performed by each of the terminal devices 100: a processing operation for transferring a character that a player possesses to the other players positioned in a vicinity of the player (e.g., Transfer 1 in FIG. 1A); and a processing operation for calculating a moving distance of the other players to which the character is transferred (e.g., Move 1 to 3 in FIG. 1A).

According to FIG. 6, whenever the sensor 113 detects current position information at predetermined intervals, the processor 112 obtains the current position information (S 101). Then, based on the current position information obtained and current position information previously obtained and stored in the memory 119, the processor 112 calculates a moving distance that has been made between these two points and determines whether or not the moving distance is longer than a first distance previously determined (e.g., 1 km) (S 102). When the moving distance is longer than the first distance, the processor 112 executes a processing operation for transmitting the position information. In other words, in this embodiment, while receiving current position information detected by the sensor 113 as needed, the processor 112 executes the processing operation related to transmitting the position information mainly when the moving distance exceeds the first distance previously determined. The processor 112 does not execute the processing operation, with some exceptions, when the moving distance does not exceed the first distance.

In this embodiment, in each of the terminal devices 100, the sensor 113 detects current position information at low frequency in the first mode (e.g., the mode in which the application is activated in the background), and the sensor 113 detects the current position information at higher frequency in the second mode (e.g., the mode in which the application is activated in the foreground). As described above, the processor 112 executes the processing operation related to transmitting the position information whenever the moving distance is longer than the first distance. Accordingly, regardless of whether each of the terminal devices 100 is in the first mode or the second mode, the processor 112 executes the processing operation related to transmitting the position information whenever the moving distance is longer than the first distance. The current position information is detected at high frequency in the second mode, and with some processing operations such as reducing the first distance, the processor 112 may execute the processing operation related to transmitting the position information at higher frequency even in the first mode.

Next, when the moving distance is longer than the first distance, the processor 112 moves on to the processing operation for transmitting the position information to the server device 200. Specifically, based on the area map information in which area identification information for identifying an area in the virtual world space and current position information in the real world space correspond to each other, the processor 112 identifies the area identification information, i.e., the area in the virtual world space where each of the terminal devices 100 is positioned in accordance with the current position information obtained (S 103). Then, the processor 112 compares area identification information stored in the memory 119 with the area identification information identified to determine whether the two match (S 104).

When the two do not match (i.e., the result of S 104 is "No" in FIG. 6), the processor 112 determines the corresponding terminal device 100 has moved to a new area, and thus updates the area identification information stored in the memory 119 by newly storing the area identification information identified. Then, the processor 112 transmits the area identification information newly stored and the current position information to the server device 200 as the position information (S 108). In this embodiment, whenever the position information is transmitted to the server device 200, the cumulative moving distance is updated and stored. Accordingly, when the position information is transmitted in S 108, the processor 112 resets the cumulative moving distance information stored in the memory 119 (S 109).

On the other hand, when the two match (i.e., the result of S 104 is "Yes" in FIG. 6), the corresponding terminal device 100 has not moved to a new area. Accordingly, the processor 112 refers to the cumulative moving distance information stored in the memory 119 to determine whether or not the cumulative moving distance is longer than the second distance previously determined (e.g., 10 km) (S 105). When the processor 112 determines the cumulative distance is longer (i.e., the result of S 105 is "No" in FIG. 6), the corresponding terminal device 100 has not moved to a new area but moved a long distance. The processor 112 thus transmits the current position information newly obtained as the position information to the server device 200 (S 108). Then, the processor 112 resets the cumulative moving distance information in the memory 119 (S 109).

When the processor 112 determines the cumulative distance is shorter (i.e., the result of S 105 is "Yes" in FIG. 6), the corresponding terminal device 100 has not moved to a new area and the moving distance is short. The processor 112 thus does not transmit the position information to the server device 200. Next, based on the current position information obtained in S 101 and the current position information stored in the memory 119, the processor 112 obtains the moving distance that has been made between these two points, and then updates and stores the cumulative moving distance information in the memory 119 (S 106). The processor 112 also determines the corresponding terminal device 100 has not stopped but moved for the reason that the moving distance was longer than the first distance in S 102. Accordingly, the stopped time information is reset to zero in the memory 119, and the count starts from zero (S 107).

In other words, in this embodiment, the processor 112 does not transmit the position information to the server device 200 whenever the sensor 113 detects the current position information. The processor 112 transmits the position information only when required to transmit the position information (i.e., when the corresponding terminal device 100 has moved to a new area, or when the moving distance is long). With this configuration, it is possible to reduce the processing operations that the processor 112 undertakes.

When each of the terminal devices 100 is in a stopped state (i.e., when the result of S 102 is "No" in FIG. 6), S 103 and the subsequent processing operations are not performed. When the stopped time is prolonged, however, the position information is not at all transmitted to the server device 200. Accordingly, in this embodiment, even with the corresponding terminal device 100 being in the stopped state, when the stopped time exceeds the first time (e.g., 20 minutes) (S 110), the processor 112 transmits the current position information obtained in S 101 as the position information to the server device 200 (S 111). This configuration prevents a certain case in which the corresponding terminal device 100 has moved a distance shorter than the second distance (e.g., 9.5 km) but has neither moved to a new area (corresponding to "Yes" in S 104) nor moved as long as the second distance (corresponding to "Yes" in S 105), and in which the position information of the corresponding terminal device 100 is thus not transmitted so the moving distance is not accumulated. Next, the processor 112 resets each of the cumulative moving distance information and the stopped time information in the memory 119 (S 112). When the stopped time does not exceed the first time, the processor 112 updates and stores the cumulative moving distance information in the memory 119 (S 106) as well as updates and stores the stopped time information in the memory (S 107). Then, the processor 112 completes a series of processing operations.

6. Flow of Processing Operations Performed by the Server Device 200

Figure 7:
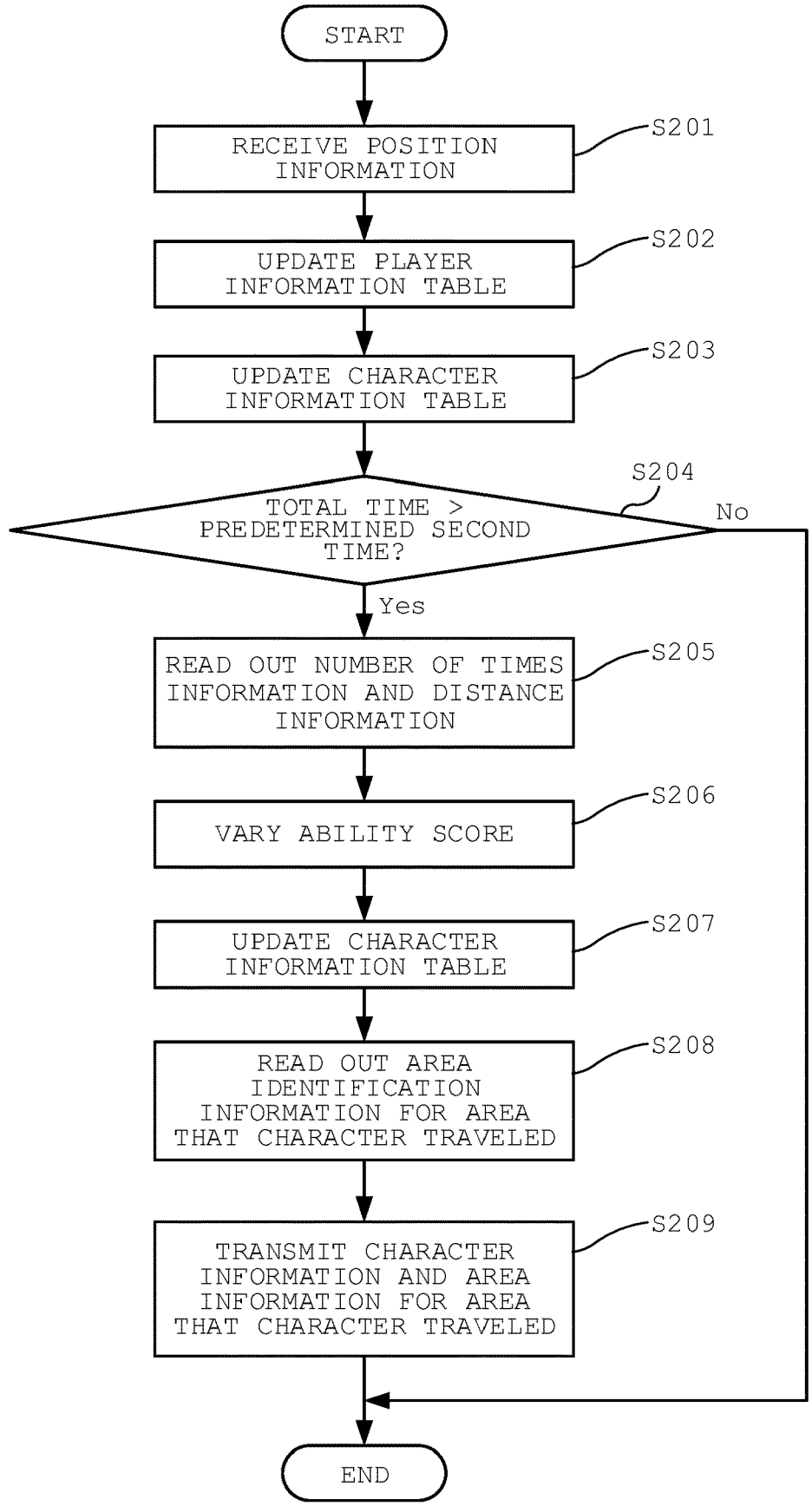
FIG. 7 is a diagram illustrating a flow of processing operations executed in the server device according to the first embodiment of the present disclosure.

FIG. 7 is a diagram illustrating a flow of processing operations executed in the server device 200 according to the first embodiment of the present disclosure. Specifically, FIG. 7 illustrates a flow of processing operations that the processor 212 executes by reading out the program stored in the memory 211, when receiving the position information from the terminal devices 100 that each of the player B, the player C, and the player E in FIG. 1A holds and transmitting the character information to the terminal devices 100 that the player A holds.

According to FIG. 7, the processor 212 in the server device 200 controls the communication interface 214 to receive position information from each of the terminal devices 100 (S 201). Then, in accordance with the position information received, the processor 212 updates and stores the moving distance information, the position information, and the area information in the player information table (FIG. 5B) (S 202). Similarly, the processor 212 updates and stores the distance information in the character information table (FIG. 5C) (S 203).

Next, the processor 212 determines whether or not the total time from when the player character C1 is first transferred to the other players exceeds the length of second time previously determined (e.g., 24 hours), based on the time when the processor 212 receives the position information (S 204). When the total time does not exceed the second time, the player character C1 may still be transferred to the other players, so that the flow of processing operations to terminates.

On the other hand, when the processor 212 determines the total time exceeds the second time, the player character C1 has terminated being transferred to the other players. Accordingly, the processor 212 reads out from the character information table in the memory 211 the following information: the number of times information that is updated whenever the player character C1 is transferred to the other players, and the distance information that is updated whenever the position information of the player character C1 is received (S 205). Then, the processor 212 performs the processing operation for varying the ability score of the player character C1 that has been transferred (S 206).

For example, the player character C1 illustrated in FIG. 1A has been associated with the player B, the player C and the player E to move the distance of 640 km (FIG. 1A). Accordingly, the processor 212 varies the ability score of the character by applying the mathematical formulas previously prepared as follows. Each of the mathematical formulas is merely an example. Alternatively, the ability score may be increased or decreased in accordance with the moving distance, and still alternatively, other mathematical formulas may be applied.

Offensive power=the offensive power before being transferred+distance×1.5; and

Hit point=the hit point before being transferred+distance×0.5.

The processor 212 updates the ability score of the player character C1 in the character information table (FIG. 5C) to the ability score that has been varied (updated) based on the calculation above (S 207). Further, the processor 212 stores in the character information table, while not particularly illustrated, the area identification information indicating the area that the player character C1 has transferred. The area identification information is based on the position information received from each of the terminal devices 100 that the players, to which the player character C1 has been transferred, hold. When the player character C1 terminates being transferred, the processor 212 reads out from the memory 211 the area identification information indicating the area that the player character C1 has traveled. (S 208). Subsequently, the processor 212 transmits the following information to the terminal devices 100 of the player A that possesses the player character C1: the character information including updated information such as the ability score, and the area information indicating the area that the player character C1 has traveled with the players to which the player character C1 has been transferred (S 209). Then, the processor 212 completes a series of processing operations.

7. Example of Screen Displayed on the Display 111 in the Terminal Devices 100

As previously described, FIG. 1B is an example of a screen displayed when the player character C1 that the player A possesses returns to the player A in response to the "Complete transfer" illustrated in FIG. 1A. According to FIG. 1B, based on the area information and others received from the server device 200, the player character C1 has moved with each of the players in the real world space, and concurrently has moved in the virtual world space in correspondence to the real world space. The moving locus in the virtual world space is illustrated by the arrow 11. In other words, the player character C1 has moved in the virtual world space 10 in a sequential order of the areas A1, A4, A3, and A7 from a starting point 12 to a final destination point 13, and has concurrently moved a distance of 640 km in the real world space in correspondence to the virtual world space 10.

FIG. 8 is a diagram illustrating an example of a screen displayed on the display 111 in each of the terminal devices 100 according to the first embodiment of the present disclosure. Specifically, FIG. 8 is an example of a screen displayed based on the character information received from the server device 200 when the player character C1 completes the transfers. According to FIG. 8, along with an overall image of the player character C1 as a player character that the player A possesses, a display 21 that indicates the player character C1 completes the transfers is presented. The display 21 includes the total moving distance of the player character C1 with the other players in the virtual world space. Additionally, the screen displayed here includes each of the ability score of the player character C1, the ability score being varied (updated) along with an increase from the ability score previously stored.

As has been described above, in this embodiment, it is possible to transmit position information more effectively by using the position information of a player or a terminal device that the player holds. Specifically, the position information is transmitted to the server device 200 only when the position information is required to be transmitted (i.e., when the player or the terminal device has moved to a new area, or when the moving distance is long), not whenever the current position information is detected by the sensor 113. With this configuration, it is possible to reduce the processing operations that the processor 112 undertakes. Further, even when being in a stopped state without moving for a long period of time, each of the terminal devices 100 transmits the position information to the server device 200. This configuration thus prevents the following case: the corresponding terminal device 100 has moved a certain distance but has neither moved to a new area nor moved as long as the second distance, hindering the position information from being transmitted and the moving distance from being accumulated.

Other Embodiments

In the first embodiment, an example of a game application that progresses by transferring a character possessed by a player has been described. However, the application according to the present disclosure may employ any application as long as the application progresses by using position information in accordance with the other players positioned in a vicinity of the player, for example, an application in which the player exchanges an item with the other players, an application in which the player competes with the other players, or an application in which the player communicates with the other players. In other words, a processing operation according to the present disclosure may preferably be applied to an application that requires transmission of the position information to the server device 200.

In the first embodiment, a "character" is described as an example of an "item" that a player transfers to the other players, but the present disclosure is not limited thereto. For example, an equipment item of a character displayed in a game application, an SNS application, various advertisement contents, or paid video contents may also be used as the "item".

As has been described above, in these other embodiments, it is possible, as in the first embodiment, to transmit position information more effectively by using the position information of a player or a terminal device that the player holds. Specifically, the position information is transmitted to the server device 200 only when the position information is required to be transmitted (i.e., when the player or the terminal device has moved to a new area, or when the moving distance is long), not whenever the current position information is detected by the sensor 113. With this configuration, it is possible to reduce the processing operations that the processor 112 undertakes. Further, even when being in a stopped state without moving for a long period of time, each of the terminal devices 100 transmits the position information to the server device 200. This configuration thus prevents the following case: the corresponding terminal device 100 has moved a certain distance but has neither moved to a new area nor moved as long as the second distance, hindering the position information from being transmitted and the moving distance from being accumulated.

Elements described in each of the embodiments may be appropriately combined or replaced to configure a system.

The processing operations and procedures described in this description are not limited to those explicitly described in the embodiments, and may be performed by software, hardware, or a combination thereof. Specifically, the processing operations and procedures described in this description are performed by mounting a logic corresponding to the processing operations to a medium such as an integrated circuit, a volatile memory, a nonvolatile memory, a magnetic disk, or an optical storage. Further, the processing operations and procedures described in this description may be mounted as a computer program and executed by various types of computers including a terminal device and a server device.

Even when the processing operations and procedures described in this description are executed by a single device, software, component, or module, such processing operations or procedures may be executed by a plurality of devices, pieces of software, components, and/or modules. Further, even when the various types of information described in this description is stored in a single memory or storage unit, such information may be dispersed and stored in a plurality of memories included in a single device or in a plurality of memories dispersedly allocated in a plurality of devices. Further, the elements of software and hardware described in this description may be performed by being integrated into a smaller number of constituent elements or by being divided into a larger number of constituent elements.

The terminal device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
a sensor configured to detect current position information of a first player that moves in a real world, the detected current position information including first and second current position information corresponding to first and second positions of the first player at first and second times, respectively, the second time being later than the first time;
a memory configured to store the detected current position information, first and second area information identified in response to a correspondence relationship between the detected current position information and one or a plurality of areas, and computer readable instructions, the first and second area information corresponding to first and second areas of the plurality of areas in the real world;
a communication interface configured to transmit predetermined information to a server device remotely disposed from the terminal device; and
a processor configured to execute the computer readable instructions so as to:
execute a game application in a virtual game world in which a player character has a first parameter value, the player character being temporarily transferable among a plurality of players in the real world who play the game application;
receive the player character by the first player from an original player of the plurality of players, the player character being temporarily held by the first player in the virtual game world of the game application;
firstly identify the first area information of the first player in response to the correspondence relationship between the first current position information and the one or the plurality of areas during the first player holds the player character;
secondly identify the second area information of the first player in response to the correspondence relationship between the second current position information and the one or the plurality of areas during the first player holds the player character;
transmit at least one of the second current position information and the second area information to the server device via the communication interface, when the first area information and the second area information are different from each other; and return the player character from the first player to the original player when a predetermined condition is met, wherein the first parameter value of the player character is changed to a second parameter value based on at least one of the second current position information and the second area information after the player character is returned to the original player from the first player in the virtual game world of the game application.

2. The terminal device according to claim 1, wherein the memory is configured to store a moving distance that the first player has moved from a predetermined position in response to the detected current position information.

3. The terminal device according to claim 2, wherein the processor is configured to transmit at least one of the second current position information and the second area information to the server device when the moving distance is more than a first predetermined distance.

4. The terminal device according to claim 2, wherein the processor is configured to reset the moving distance that is stored in the memory when the processor transmits at least one of the second current position and the second area information to the server device.

5. The terminal device according to claim 2, wherein the processor is configured to execute the secondly identification of the second area information when the moving distance obtained between the first current position information and the second current position information is more than a second predetermined distance.

6. The terminal device according to claim 5, wherein the sensor is configured to have first and second operation modes, in the first mode, the sensor is configured to detect the current position information at a first frequency, and in the second mode, the sensor is configured to detect the current position information at a second frequency that is higher than the first frequency.

7. The terminal device according to claim 6, wherein the processor is configured to execute the secondly identification of the second area information, whether being in the first mode or in the second mode.

8. The terminal device according to claim 6, wherein the processor is configured to execute the secondly identification of the second area information in the second mode at a higher frequency than the first mode.

9. The terminal device according to claim 6, wherein the game application progresses in response to the detected current position information detected by the sensor, and the processor is configured to execute the game application by using the current position information obtained in the first mode.

10. The terminal device according to claim 1, wherein the processor is configured to transmit at least one of the second current position information and the second area information to the server device when an elapsed time from a moment that the first player stops moving in the real world exceeds a first predetermined period of time.

11. A computer program product embodying computer readable instructions stored on a non-transitory computer-readable storage medium for causing a computer to execute a process by a processor so as to perform the steps of:

detecting current position information of a first player that moves in a real world, the detected current position information including first and second current position information corresponding to first and second positions of the first player at first and second times, respectively, the second time being later than the first time;

identifying first and second area information in response to a correspondence relationship between the detected current position information and one or a plurality of areas, the first and second area information corresponding to first and second areas of the plurality of areas in the real world;

executing a game application in a virtual game world in which a player character has a first parameter value, the player character being temporarily transferable among a plurality of players in the real world who play the game application;

receiving the player character by the first player from an original player of the plurality of players, the player character being temporarily held by the first player in the virtual game world of the game application;

firstly identifying the first area information of the first player in response to the correspondence relationship between the first current position information and the one or the plurality of areas during the first player holds the player character;

secondly identifying the second area information in response to the correspondence relationship between the second current position information and the one or the plurality of areas during the first player holds the player character;

transmitting at least one of the second current position information and the second area information to a server device via a communication interface when the first area information and the second area information are different from each other; and returning the player character from the first player to the original player when a predetermined condition is met, wherein the first parameter value of the player character is changed to a second parameter value based on at least one of the second current position information and the second area information after the player character is returned to the original player from the first player in the virtual game world of the game application.

12. A method performed for causing a processor in a computer to execute a process, the computer including: a sensor configured to detect current position information of a first player; a memory configured to store area information identified in correspondence to the current position information detected by the sensor based on a correspondence relationship between one or a plurality of area and the current position information, and computer readable instructions; and a communication interface configured to transmit predetermined information to a server device remotely disposed, the method comprising executing on the processor the computer readable instructions comprising the steps of:

detecting the current position information of the first player that moves in a real world, the detected current position information including first and second current position information corresponding to first and second positions of the first player at first and second times, respectively, the second time being later than the first time;

identifying first and second area information in response to a correspondence relationship between the detected current position information and one or a plurality of areas, the first and second area information corresponding to first and second areas of the plurality of areas in the real world;

executing a game application in a virtual game world in which a player character has a first parameter value, the player character being temporarily transferable among a plurality of players in the real world who play the game application;

receiving the player character by the first player from an original player of the plurality of players, the player character being temporarily held by the first player in the virtual game world of the game application;

firstly identifying the first area information in response to the correspondence relationship between the first current position information and the one or the plurality of areas during the first player holds the player character;

secondly identifying the second area information in response to the correspondence relationship between the second current position information and the one or the plurality of areas during the first player holds the player character;

transmitting at least one of the second current position information and the second area information to a server device via the communication interface when the first area information and the second area information are different from each other; and returning the player character from the first player to the original player when a predetermined condition is met, wherein the first parameter value of the player character is changed to a second parameter value based on at least one of the second current position information and the second area information after the player character is returned to the original player from the first player in the virtual game world of the game application.

13. The terminal device according to claim 1,
wherein the predetermined condition is met when a period of time during which the first player holds the player character in the virtual game world of the game application exceeds a second predetermined period of time.

14. The computer program product according to claim 11,
wherein the predetermined condition is met when a period of time during which the first player holds the player character in the virtual game world of the game application exceeds a second predetermined period of time.

15. The method according to claim 12,
wherein the predetermined condition is met when a period of time during which the first player holds the player character in the virtual game world of the game application exceeds a second predetermined period of time.

* * * * *